United States Patent Office 2,877,125
Patented Mar. 10, 1959

2,877,125

REFRACTORY MIX

Victor J. Duplin, Jr., Fanwood, N. J., assignor to The Babcock & Wilcox Company, New York, N. Y., a corporation of New Jersey No Drawing. Application April 6, 1955
Serial No. 499,758

3 Claims. (Cl. 106—67)

This invention relates in general to a dry refractory mix and more particularly to an improved air and heat setting refractory mix which develops a gas impervious structure after being mixed with water and heat dried.

Air setting and moldable refractories are often used to protect metal surfaces such as vapor generating tubes and pressure vessel walls from the temperature effects of heating gases. Such refractories after setting are generally porous and allow corrosive elements of the heating gases to enter through the pores of the refractory and attack the metal surface on which the refractory is applied. The attack on the metal surface causes a corrosive material build-up which pushes the refractory away from the metal wall thus increasing the rate of metal and refractory deterioration.

The present invention provides a refractory mix having a dense particle structure which is substantially gas impervious when set, thus preventing adverse effects of the gases.

Further, the invention is directed to a refractory mix which when combined with water and dried provides a gas impervious refractory composition which has excellent metal adherence properties and spalling resistance.

The inventive composition is obtained by combining with clean water a dry mixture which would have the following approximate composition by dry weight;

| Material | Percentage Range | Preferred Percentage |
|---|---|---|
| 4 to 8 mesh alumina-silica grog | 45 to 58 | 55 |
| 32 to 42 mesh alumina-silica grog | 25 to 35 | 27 |
| plastic ball clay | 10 to 15 | 12 |
| dry sodium-silicate | 4 to 8 | 6 |

The above composition is mixed with clean water in the proportions of 100 pounds of mix to 10 to 16 pounds of water, the amount of water being varied in accordance with the type of application desired. For instance, where the refractory is applied by pounding as is normal in boiler applications, the mixture would be made up in a stiff or plastic consistency and would require approximately 10 pounds of water per 100 pounds of mix having the following preferred composition, dry weight;

| Material: | Preferred percentage |
|---|---|
| 4 mesh alumina-silica grog | 51 |
| 35 mesh alumina-silica grog | 31 |
| Ball clay | 12 |
| Dry sodium-silicate | 6 |

If it is desired to cast, vibrate, or trowel the mixture, it would be desirable to use 14 pounds of water per 100 pounds of the last mentioned mix.

If it is desirable to apply the refractory by using an air aspirating nozzle, or compressed air spray equipment the mixture would have 16 pounds of water per 100 pounds of mix having the following preferred composition, dry weight;

| Material: | Preferred percentage |
|---|---|
| 8 mesh alumina-silica grog | 55 |
| 35 mesh alumina-silica grog | 27 |
| Ball clay | 12 |
| Dry sodium-silicate | 6 |

The grog is an alumina-silica clay such as Georgia kaolin which has been calcined at high temperatures to vitrification and crushed and screened to definite particle sizings. The particle sizes are determined by standard Tyler screens. Such screening is accomplished by taking the normal grinding effluent from grinders and screening out all particles larger than the screen size mentioned. For example, a 4 mesh grog will pass through a Tyler 4 mesh screen and consist of particles ranging to finer particles, some of which pass 100 mesh.

The 35 mesh sizings contain ranges of particle sizes some of which pass 325 mesh. The grog size mixtures proposed produce the most dense refractory because the small 35 to minus 325 mesh particles fill the voids between the large 4 to 8 mesh particles. The size of the larger particles determine the amount of the smaller particles which are to be mixed with it. For instance, where the wet mixture is to be sprayed the largest particle size is 8 mesh because the larger sized particles bounce off during application. To produce the dense refractory required, 35 mesh grog is added. Grog sizes having less than or greater than the amount of 35 mesh noted produce a lighter and more open and porous structure resulting in a refractory having less strength. It has been found that the ranges given above produce a refractory composition which is most dense and which when set and dried would have a density of 120 to 125 pounds per cubic foot.

Ball clay such as Kentucky plastic ball clay is characteristically very plastic and workable when it is wetted with moisture. This clay is added to the grog mixture in an amount of 12 percent to help the grog particles slip and slide into closer contact with one another and to fill the voids between the interlocking grog structure. After firing this clay becomes a portion of the solid refractory mass and adds to the gas imperviousness of the structure. The clay, although used most effectively as 12 percent by weight, may be used in the range of 10 to 15 percent. However, if more than 15 percent of the clay is added, there will be too much present so that the voids between the grog will be filled and in addition there will be clay pushing the grog apart so that after firing such a mixture would result in more porosity and decreased refractory strength. If less than 10 percent of the ball clay is added, the resulting refractory is too porous and lacking in workability.

The sodium-silicate in dry form is added to the mix to enhance the plasticity, to improve the adherence qualities of the refractory to make it suitable for use as a moldable material. Preferably, 6 percent by weight of the dry composition should be sodium-silicate which has a soda ($Na_2O$) to silica ratio in the range of 1:2. However, the sodium-silicate may be used in the amounts of 4 percent to 8 percent. If more than 8 percent is used, the additional percentage of sodium silicate reduces the refractoriness or heat resistance of the molded, dry refractory. While sodium-silicate has been mentioned as preferred with a soda to silica ratio of 1 to 2 those skilled in the art will appreciate that sodium-silicate of other ratios which are close to the preferred may be used with equal facility, such as ratios of 1 to 1.6 and 1 to 2.5. In each mixture as such, sodium-silicate is added in a dry form, the main factor is the quantity of water added to the mixture as hereinbefore described. Too little of the sodium-silicate results in less binding, less adherence and hence low resistance to spalling and abrasion in the dry and fired refractory.

Normally, the mix after having water added to it in proper amount is used to protect metal surfaces from the deleterious effects of corrosive elements in high temperature heating gases. After the composition is applied either by troweling, pounding or spraying, it is then slowly dried in place by subjecting it to heating temperatures up to 1600° F. or its use limit (3000° F.). This heating changes the chemical and physical structure of the mix leaving a dry, hard, and strong refractory, dense in structure and impervious to heating gases.

This refractory has a high degree of dimensional stability. It shrinks very little upon either initial drying or heating or continued reheating. It adheres to the metal surface to which it is applied during and after drying and heating and sets up to a structure having excellent dried strength.

The refractory of the invention has a very dense structure which will prevent the passage of gases through it to the metal or surfaces over which it is applied. It has excellent spalling resistance, i. e. ability to resist severe and repetitive temperature changes without the development of cracks in the molded and fired structure which ordinarily would permit gas to penetrate to the surface of the protected material. It may be used efficiently in temperatures up to 2800° F. for an indefinite time, and up to 3000° F., for short periods of time. The refractory is particularly applicable for use in covering metal surfaces when high temperature gases have reducing or oxidizing characteristics or contain condensible and corrosive acids or salts present. It prevents these gases and salts from reaching or reacting with the metal by providing an impervious seal over the surface of the metal, thereby preventing any deleterious chemical reaction between the metals, the gases, acids or salts. These compositions are designed to reseal themselves in the design operating ranges and temperatures from 1000° F. to 2500° F. so that they continue to offer protection after they have been cycled by rapid heating and cooling. In this manner they prevent the oxidation of metal on which they are placed by preventing oxygen and molten salts from reaching the metal surface. They prevent the carburization of metals and alloys subject to residing conditions. They prevent the disintegration of the refractory itself by carbon disposition, since it prevents carbon monoxide from contracting and forming reaction centers with iron oxides in or under the refractory surface.

While in accordance with the provisions of the statutes, there is illustrated and described herein a specific form of the invention. Those skilled in the art will understand that changes may be made in the embodiment of the invention disclosed, without departing from the invention as covered by the claims, and that certain features of the invention may sometimes be used to advantage without a corresponding use of other features.

I claim:

1. A refractory mix which when combined with water forms an air setting refractory consisting essentially of by dry weight, 45 to 58 percent of a first ingredient, 25 to 35 percent of a second ingredient, said first ingredient consisting of alumina silica normally ground grog particles which pass through a Tyler screen having a mesh size in the range of 4 to 8 and said second ingredient consisting of alumina silica normally ground grog particles which pass through a Tyler screen having a mesh size in the range of 32 to 42, a third ingredient consisting of 10 to 15 percent of plastic refractory ball clay and a fourth ingredient consisting of 4 to 8 percent of dry sodium silicate.

2. A refractory mix which when combined with water forms an air setting refractory consisting essentially or by dry weight, 55 percent of a first ingredient, 27 percent of a second ingredient, said first ingredient consisting of alumina silica normally ground grog particles which pass through an 8 mesh Tyler screen and a said second ingredient consisting of alumina silica grog normally ground particles which pass through a 35 mesh Tyler screen, a third ingredient consisting of 12 percent of plastic refractory ball clay and a fourth ingredient consisting of 6 percent of dry sodium silicate.

3. A refractory mix which when combined with water forms an air setting refractory consisting essentially of by dry weight, 51 percent of a first ingredient, 31 percent of a second ingredient, said first ingredient consisting of alumina silica grog normally ground particles which will pass through a 4 mesh Tyler screen and a said second ingredient consisting of alumina silica grog normally ground particles which pass through a 35 mesh Tyler screen, a third ingredient consisting of 12 percent of plastic refractory ball clay and a fourth ingredient consisting of 6 percent of dry sodium silicate.

References Cited in the file of this patent

UNITED STATES PATENTS 2,425,151     Greger _____ Aug. 5, 1947

FOREIGN PATENTS 10,857     Australia _____ 1933